United States Patent [19]
Rice

[11] Patent Number: 5,752,639
[45] Date of Patent: May 19, 1998

[54] TRAILER HITCH-MOUNTABLE UTILITY HOLDER

[76] Inventor: David Rice, 5575 Loganberry La., Yorba Linda, Calif. 92687

[21] Appl. No.: 741,047

[22] Filed: Oct. 30, 1996

Related U.S. Application Data

[60] Provisional application No. 60/006,309 Nov. 7, 1995.
[51] Int. Cl.$^6$ .................................................. B60R 9/10
[52] U.S. Cl. ........................... 224/521; 224/510; 224/536
[58] Field of Search .................................. 224/521, 519, 224/510, 536, 533, 924

[56] References Cited

U.S. PATENT DOCUMENTS

| | | | |
|---|---|---|---|
| 5,067,641 | 11/1991 | Johnson et al. | 224/521 X |
| 5,096,102 | 3/1992 | Tolson | 224/536 X |
| 5,372,287 | 12/1994 | Deguevara | 224/510 |
| 5,433,356 | 7/1995 | Russell | 224/519 |
| 5,443,189 | 8/1995 | Hirschfield | 224/521 X |
| 5,458,389 | 10/1995 | Young | 224/521 X |
| 5,469,997 | 11/1995 | Carlson | 224/521 |
| 5,476,202 | 12/1995 | Lipp | 224/519 X |

*Primary Examiner*—Renee S. Luebke
*Attorney, Agent, or Firm*—Klein & Szekeres, LLP

[57] ABSTRACT

A holding or carrying device that is mountable to a trailer hitch comprises a support member having a horizontal portion that is removably attachable to the hitch, and a vertical portion that contains a tubular telescoping element. Attached to the upper end of the telescoping element is a carrying or holding element, such as a table, platform, or bracket. In one embodiment, the telescoping element is height-adjustable by means a plurality of opposed pairs of apertures in the telescoping element that are registrable with an opposed pair of apertures in the vertical portion, whereby a locking pin can be received in the opposed pair of apertures in the vertical portion, and a selected one of the opposed aperture pairs in the telescoping element. In another embodiment, a bicycle rack assembly is attached to the upper end of the telescoping element. The rack assembly comprises a rack member having a pair of support rods located and configured to support a bicycle frame, and a clamping member, operatively engageable with the rack member, that clamps the bicycle frame against the support rods.

7 Claims, 2 Drawing Sheets

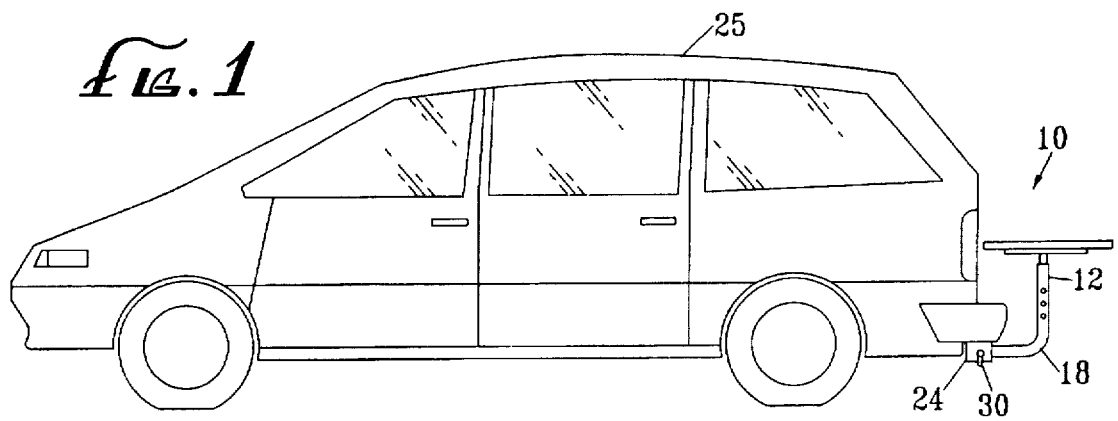
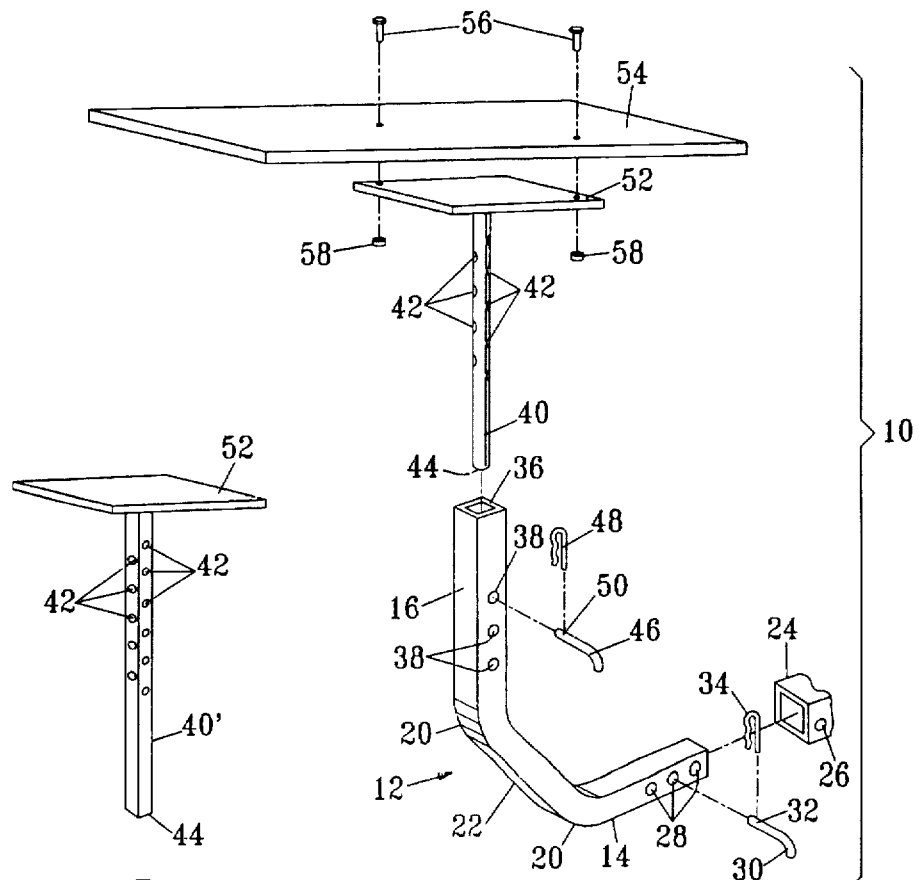

1

TRAILER HITCH-MOUNTABLE UTILITY HOLDER

CROSS-REFERENCE TO RELATED APPLICATION

This application claims the benefit, under 35 U.S.C. Section 119(e), of provisional application Ser. No. 60/006, 309; filed Nov. 7, 1995.

BACKGROUND OF THE INVENTION

This invention relates generally to the field of vehicle-mountable racks and holders. More specifically, it relates to a utility platform or rack that is removably mountable to a trailer hitch attached to a vehicle.

On many occasions, it would be convenient or desirable temporarily to attach a platform, table, rack, or other type of holding or carrying apparatus to a motor vehicle, either for carrying some article, or for holding some article in close proximity to the vehicle while parked. In most cases, the holding or carrying apparatus is permanently or semi-permanently fixed to the vehicle, as is the case, for example, with the typical luggage rack. In other instances, while the holding or carrying apparatus may be removably mounted on the vehicle, a mounting or attachment device is required that must be fixed to the vehicle by bolts or the like.

There has thus been a need for a carrying or holding device or apparatus that may be easily and quickly attached to and detached from a vehicle, and which requires little or no additional mounting "hardware" that must be permanently fixed to the vehicle.

One approach that might be taken would be to utilize existing structure on the vehicle that is already adapted for the removable attachment of accessories thereto. A drawback to this approach is the need for some uniformity in such "ad hoc" attachment structures. To a great extent, such uniformity does not exist. One exception, however, is the standard type of trailer hitch that is installed on many motor vehicles, either as "original equipment", or in the "aftermarket". One of the most common types of trailer hitch for automobiles, small trucks, and "minivans" is the type comprising a hollow, open-ended tube of square cross-section, with apertures for receiving a linkage pin or bolt.

When not in use for pulling a trailer, the typical trailer hitch is a useless appendage. It would therefore be advantageous to find alternative uses for the hitch. One such alternative use could be as a mounting or attachment fixture for a removable holding or carrying device or apparatus.

It would therefore be advantageous to provide a holding or carrying device or apparatus that could be removable attached to the standard trailer hitch.

SUMMARY OF THE INVENTION

Broadly, the present invention is a multi-purpose holding or carrying device that is removably mountable to a trailer hitch, of the type comprising a hollow, open-ended tube of square cross-section, with apertures for receiving a locking pin, wherein the holding or carrying device comprises a support member having a horizontal portion that is attachable to the hitch, and a vertical portion that contains a tubular telescoping element. The horizontal portion has at least one pair of opposed apertures that are registrable with a pair of opposed apertures in the hitch, whereby a locking pin can be inserted through the two pairs of registered apertures to secure the support member to the hitch. Attached to the upper end of the telescoping element is a carrying or holding element, such as a table, platform, or bracket.

More specifically, the telescoping element and the vertical portion of the support member have registering holes for the insertion of a pin for height adjustment. The holes may be arranged on the telescoping element at several different circumferential positions to allow rotational adjustment.

In a specific preferred embodiment, the holding or carrying element is a platform or table of any suitable size or shape. In a modified form of this preferred embodiment, the holding or carrying element is a rack or carrier for a bicycle or the like. In either case, the telescoping element may be either circular or square in cross-section.

As will be more fully appreciated from the following detailed description, the present invention provides a carrying or holding device that can be quickly and easily attached to and detached from the vehicle, by means of a previously installed trailer hitch, without the need for any additional mounting hardware or fastening means attached to the vehicle.

BRIEF DESCRIPTION OF THE DRAWINGS

FIG. 1 is a side elevational view of a motor vehicle to which is attached a trailer hitch-mountable utility holder, in accordance with a first preferred embodiment of the present invention;

FIG. 2 is an exploded perspective view of a trailer hitch-mountable utility holder, in accordance with the first preferred embodiment of the present invention, but with a modification of the support member configuration;

FIG. 3 is a perspective view of a modified form of the telescoping element employed in the first preferred embodiment of the present invention;

DETAILED DESCRIPTION OF THE PREFERRED MBODIMENTS

Figure 4:
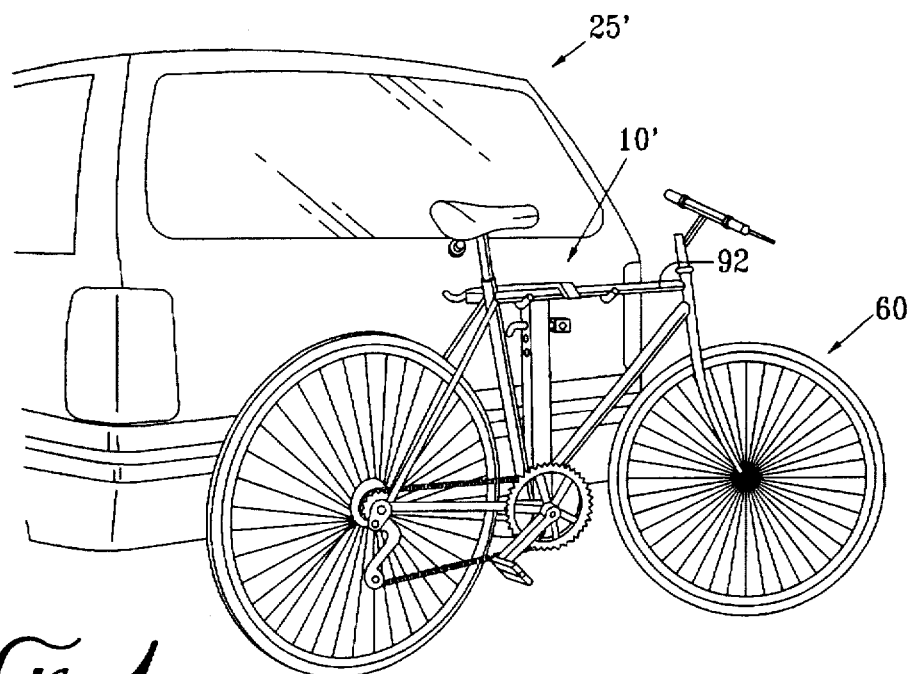
FIG. 4 is a perspective view of a second preferred embodiment of the present invention, adapted for use as a bicycle rack or carrier, shown mounted on a motor vehicle, and being used to carry a bicycle.

FIGS. 1 and 2 illustrate a trailer hitch-mountable utility holder 10, in accordance with a first preferred embodiment of the present invention. The holder 10 comprises a support member 12 having a horizontal portion 14 and a vertical portion 16. Advantageously, the support member 12 is formed from a single length of square cross-section hollow metal tubing, preferably cold rolled steel or aluminum. As shown in FIG. 1, the support member 12 may be formed into its horizontal portion 14 and vertical portion 16 by a single 90 degree bend 18. Alternatively, as shown in FIG. 2, the support member 12 may be formed with two 45 degree bends 20, thereby separating the horizontal portion 14 and the vertical portion 16 by a short diagonal portion 22.

The external cross-sectional width of the support member 12 is selected so that it mates with a trailer hitch 24, attached in the conventional way to the frame of a motor vehicle 25 (FIG. 1). The hitch 24 is of the conventional type, well-known in the art, comprising a hollow, open-ended tube of square cross section. The hitch 24 has at least one pair of apertures 26, only one of the pair being shown in FIG. 2. The horizontal portion 14 of the support member 12 is receivable into the hitch 24, and it has at least one opposed pair, and preferably a plurality of opposed pairs, of apertures 28 that are registrable with the apertures 26 in the hitch.

(Only one of each opposed pair of the support member horizontal portion apertures 28 is shown in FIG. 2.) When the horizontal support member portion 14 is inserted into the hitch 24 so as to register an opposed pair of horizontal portion apertures 28 with an opposed pair of hitch apertures 26, a first locking pin 30 is inserted through the registered aperture pairs. One end of the locking pin 30 has a diametric bore 32 that receives a locking member, such as a cotter pin 34, to lock the support member 12 to the hitch 24. The provision of multiple opposed pairs of horizontal portion apertures 28 allows the horizontal position of the support member 12 to be adjusted by selecting the appropriate opposed pair of apertures 28.

The support member vertical portion 16 has an open upper end 36 and at least one opposed pair, and preferably a second plurality of opposed pairs, of apertures 38, only one of each opposed pair being shown in FIG. 2. The open end 36 receives a telescoping element 40 (FIG. 2) or 40' (FIG. 3) in the form of an elongate hollow tube. As shown in FIG. 2, the telescoping element 40 may be substantially circular in cross section. Alternatively, as shown in FIG. 3, the telescoping element 40' is square in cross section. In either case, the telescoping element 40, 40' is provided with at least one opposed pair, and preferably a third plurality of opposed pairs, of apertures 42 that are registrable with the apertures 38 of the support member vertical portion. (Only one of each opposed pair of the telescoping element apertures 42 is shown in the drawings.) In both the circular cross section telescoping element 40 and the square cross section telescoping element 40', alternating opposed pairs of the telescoping element apertures 42 are offset by 90 degrees so as to define mutually orthogonal axes.

The telescoping element 40, 40' has a lower end 44 that is inserted into the open upper end 36 of the support member vertical portion 16 so as to register an opposed pair of telescoping element apertures 42 with an opposed pair of support element vertical portion apertures 38. When the selected sets of opposed pairs are in registration, a second locking pin 46 is inserted through the two registered pairs of holes, and a cotter pin 48 or the like is inserted through a diametric bore 50 in one end of the locking pin 46. The provision of multiple opposed pairs of telescoping element apertures 42 and support element vertical portion apertures 38 allows the vertical height of the telescoping element 40, 40' to be adjusted by selecting the appropriate opposed aperture pairs. Furthermore, the provision of alternating opposed pairs of telescoping element apertures 42 along mutually orthogonal axes allows the rotational position of the telescoping element 40, 40' to be selectably adjusted.

The telescoping element 40, 42 has an upper end to which is fixed a platform 52, which may have any desired shape or size suitable for its intended purpose, and the square shape shown in the drawings is exemplary only. The surface area of the platform 52 may optionally be increased by the attachment of a removable extension platform 54, by means such as screws 56 and nuts 58. Alternatively, a platform with folding leaves (not shown) may be fixed to the upper end of the telescoping element 40, 40'. The platform 52 may be used to hold or support any desired object, such as a power tool, hand tools, a lantern, a tackle box, or a tool box, just to name a few. When the extension platform 54 is attached, it can be used as a picnic table, workbench, or the like.

When use of the utility holder 10 is finished, it is merely removed from the hitch 24 by removing the first locking pin 30, and then pulling the horizontal support member portion 14 out of the hitch 24. The entire utility holder 10 can then be stored, either in the vehicle 25, or elsewhere, for future use. Several telescoping elements 40, 40', each with a different type of platform 52, may be made available and interchanged as needed for different uses, as desired.

Figure 5:
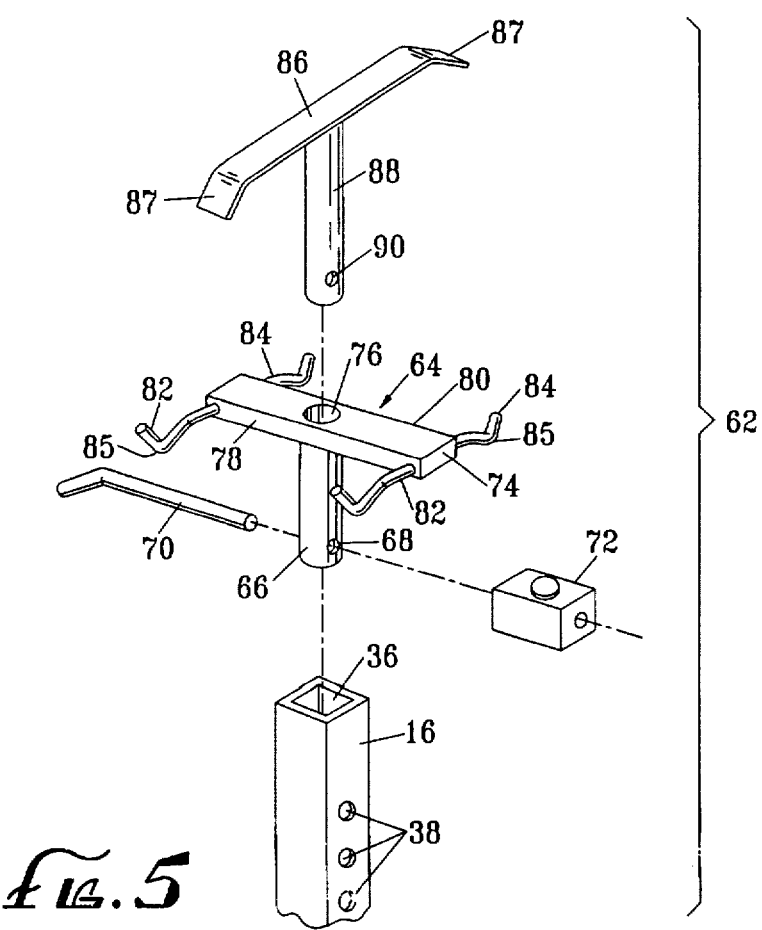
FIG. 5 is an exploded perspective view of the bicycle holding mechanism of the second preferred embodiment of the present invention.

FIGS. 4 and 5 illustrate a trailer hitch-mountable utility holder 10', in accordance with a second preferred embodiment of the present invention, specifically configured for use as a carrier for a bicycle 60. FIG. 4 shows the utility holder 10' mounted on a motor vehicle 25', and the mechanism for mounting the utility holder 10' to a trailer hitch (not shown) on the vehicle 25' is identical to that which has been described above, and illustrated in FIG. 2.

The utility holder 10' differs from the above-described first embodiment in the substitution of a bicycle rack assembly 62, shown in FIG. 5, for the above-described telescoping element 40, 40'. The rack assembly 62 comprises a rack member 64 fixed to the upper end of a telescoping mounting tube 66 having a diametrically opposed pair of apertures 68 (only one of which is shown in the drawing), that is insertable into the open upper end 36 of the support member vertical 16. When the mounting tube 66 is so inserted, the opposed pair of apertures 68 are registered and aligned with one opposed pair of support member vertical portion apertures 38. When the two pairs of apertures 68, 38 are registered, a locking pin 70 is inserted therethrough, and a key lock receiver 72 (of conventional design) is advantageously installed on end of the locking pin 70 to lock the pin 70, and thus the rack member 64 in place.

The rack member 64 itself comprises a planar horizontal base member 74 having a central aperture 76 that communicates with the interior of the mounting tube 66, and that has a diameter substantially equal to the inside diameter of the mounting tube 76. The base member 74 is preferably rectangular in shape, and it is oriented so that its longer dimension is substantially perpendicular to the longitudinal axis of the vehicle 25'. Thus, the base member 74 defines a rear edge 78 that faces rearwardly, and a front edge 80 that faces forwardly, when the rack assembly 62 is mounted on the support member 12. Extending rearwardly from the rear edge 78 of the base member 74, near the ends thereof, is a first or rear pair of carrier rods 82. Likewise, a second or front pair of carrier rods 84 extend forwardly from the front edge 80, one near each end thereof. Each of the carrier rods 82, 84 is formed with a downward, U-shaped bend 85 near its outer end. As will be discussed below, the provision of two pairs of carrier rods allows the carrying of two bicycles. Alternatively, only a single pair of carrier rods (preferably the rear pair 82) can be provided if the utility holder 10' is to be used to carry only a single bicycle.

A transverse clamping bar 86, having opposed downturned ends 87, is attached to the upper end of a vertical tubular clamping shaft 88. The clamping shaft 88 has an outside diameter that is slightly less than the diameter of the central aperture 76 and the inside diameter of the mounting tube 66, so that the shaft can be slidably received in the mounting tube 66 through the central aperture 76. Near the lower end of the clamping shaft 88 is a diametrically opposed pair of clamping shaft apertures 90 (only one of which is shown in the drawings). The clamping shaft apertures 90 are registrable with the mounting tube apertures 68 and the support member vertical portion apertures 38, so that, when inserted the appropriate distance into the mounting tube 66, the clamping shaft 88 apertures 90 are aligned with the mounting tube apertures 68 and the support member vertical portion apertures 38. When the three pairs of apertures 38, 68, 90 are aligned, the locking pin 70 can be inserted therethrough and locked into place by means of the key lock receiver 72.

To use the utility holder 10' as a bicycle rack, the mounting tube 66 of the rack assembly 62 is inserted into the open end 36 of the support member vertical portion 16 until it bottoms out, at which point the mounting tube apertures 68 are alignable with an opposed pair of support member vertical portion apertures 38 when the mounting tube 66 is properly oriented rotationally (i.e., when the base member 74 is aligned as described above). A bicycle 60 is then placed on the rear pair of carrier rods 82, as shown in FIG. 4; that is, the horizontal top brace 92 of the bicycle frame is place on the rear pair of carrier rods 82, so as to be received in the U-shaped bends 85 thereof. A second bicycle (not shown) may be similarly placed on the front pair of carrier rods 84, if desired.

The clamping tube 88 is then inserted into the mounting tube 66 via the central aperture 76, and pushed downwardly until the clamping bar 86 engages against the horizontal top brace 92 of the bicycle. At this point, as described above, the clamping tube apertures 90 are aligned with the mounting tube apertures 68 and the support member vertical portion apertures 38, so that the locking pin 70 and the key lock receiver 72 can be installed, as previously described. With the clamping bar 86 so positioned, its down-turned ends 87 seat against the horizontal brace 92 to clamp one or two bicycles in place against their associated carrier rod pairs.

Because bicycle frames are typically made of tubing of a standardized diameter, the clamping tube apertures 90 can be located in the clamping tube 88 at a vertical distance that creates the above-described aperture alignment "automatically" when the clamping bar is seated against the top of the horizontal brace 92 to clamp the bicycle 60 in place. Alternatively, several opposed pairs of clamping tube apertures can be provided along the length of the clamping tube, to accommodate bicycle frame members of non-standard diameters.

As mentioned above, the rack member 64 can be made with just one pair of carrier rods, if carrying only a single bicycle is desired. In such a single bicycle version, the clamping bar 86 may be made with only a single down-turned end 87, although dual down-turned ends may nevertheless be preferable for convenience of use.

There has thus been described a trailer hitch-mountable utility holder that is readily and easily mounted to a standard trailer hitch, and that can be just as quickly and easily detached therefrom for storage, without the need for any additional mounting hardware or fastening means attached to the vehicle. Furthermore, the utility holder displays wide versatility in its applications and uses. In addition, the utility holder of the present invention can be easily and economically manufactured, requiring little or no precision machining of its components.

What is claimed is:

1. A carrying device that is removably mountable to a trailer hitch, comprising:
   a hollow, tubular support member having a horizontal portion that is attachable to the hitch and a vertical portion that has a first pair of opposed apertures;
   a tubular telescoping element slidably disposed in the vertical portion, the telescoping element having an upper end that extends from the vertical portion of the support member, the telescoping element including a first hollow tube having a second pair of opposed apertures that are registrable with the first pair of opposed apertures;
   a locking member dimensioned to be received in the first and second pairs of opposed apertures when they are aligned in registration; and
   a bicycle rack assembly attached to the upper end of the telescoping element, the bicycle rack assembly comprising:
      a substantially horizontal base member having a central aperture communicating with the interior of the first hollow tube;
      a pair of substantially parallel support rods extending from one side of the base member and dimensioned and oriented for supporting a bicycle frame; and
      a clamping member operatively engageable with the first hollow tube, wherein the clamping member comprises:
         a second hollow tube dimensioned to be received in the first hollow tube and having an upper end; and
         a clamping bar attached to the upper end of the second hollow tube.

2. The device of claim 1, wherein the first pair of opposed apertures is one pair of a plurality of first pairs of opposed apertures.

3. The device of claim 1, wherein the second pair of opposed apertures is one pair of a plurality of second pairs of opposed apertures.

4. The device of claim 1, wherein the locking member is a locking pin.

5. The device of claim 1, wherein the second hollow tube has a third opposed pair of apertures that are alignable in registration with the second pair of apertures when the second hollow tube is received in the first hollow tube, and wherein the locking member is dimensioned to be received in the first, second, and third opposed pairs of apertures when the first, second, and third opposed pairs of apertures are aligned in registration.

6. A carrying device that is removably mountable to a trailer hitch, comprising:
   a hollow, tubular support member having a horizontal portion that is attachable to the hitch and a vertical portion that has a plurality of opposed pairs of apertures;
   a tubular telescoping element slidably disposed in the vertical portion, the telescoping element having an upper end that extends from the vertical portion of the support member, the telescoping element including a first hollow tube having a first opposed pair of apertures that is registrable with a selectable one pair of the plurality of opposed pairs of apertures;
   a locking pin dimensioned to be received in the selected one pair of the plurality of apertures and the first opposed pair of apertures when the selected one pair of the plurality of apertures and the first opposed pair of apertures are aligned in registration; and
   a bicycle rack assembly element attached to the upper end of the telescoping element, the bicycle rack assembly comprising:
      a substantially horizontal base member having a central aperture communicating with the interior of the first hollow tube;
      a pair of substantially parallel support rods extending from one side of the base member and dimensioned and oriented for supporting a bicycle frame; and
      a clamping member operatively engageable with the first hollow tube, wherein the clamping member comprises;
         a second hollow tube dimensioned to be received in the first hollow tube and having an upper end; and
         a clamping bar attached to the upper end of the second hollow tube.

7. The device of claim 6, wherein the second hollow tube has a second opposed pair of apertures that are alignable in registration with the first opposed pair of apertures when the second hollow tube is received in the first hollow tube, and wherein the locking pin is dimensioned to be received in the first and second opposed pairs of apertures and the selected one of the plurality of opposed pairs of apertures when the first and second opposed pairs of apertures and the selected one of the plurality of opposed pairs of apertures are aligned in registration.

* * * * *